US012780549B2

(12) United States Patent
McAleenan

(10) Patent No.: US 12,780,549 B2
(45) Date of Patent: Nov. 3, 2026

(54) TEMPERATURE-DRIVEN DYNAMIC ORDER SEQUENCING IN ORDER FULFILLMENT

(71) Applicant: Phononic, Inc., Durham, NC (US)

(72) Inventor: Colin McAleenan, Durham, NC (US)

(73) Assignee: Phononic, Inc., Durham, NC (US)

( * ) Notice: Subject to any disclaimer, the term of this patent is extended or adjusted under 35 U.S.C. 154(b) by 336 days.

(21) Appl. No.: 18/507,704

(22) Filed: Nov. 13, 2023

(65) Prior Publication Data

US 2024/0158172 A1 May 16, 2024

Related U.S. Application Data

(60) Provisional application No. 63/424,562, filed on Nov. 11, 2022.

(51) Int. Cl.
*B65G 1/137* (2006.01)
*B65G 1/06* (2006.01)

(52) U.S. Cl.
CPC ........... *B65G 1/1373* (2013.01); *B65G 1/065* (2013.01); *B65G 2201/0258* (2013.01); *B65G 2203/0266* (2013.01)

(58) Field of Classification Search
CPC ............ B65G 1/065; B65G 2201/0258; B65G 2203/0266; B65G 1/1373
See application file for complete search history.

(56) References Cited

U.S. PATENT DOCUMENTS

| | | | | |
|---|---|---|---|---|
| 2018/0058739 | A1* | 3/2018 | Zou | F25B 49/00 |
| 2019/0263219 | A1* | 8/2019 | Spath | B60H 1/00264 |
| 2020/0071076 | A1* | 3/2020 | Fosnight | G05D 1/0276 |
| 2021/0199353 | A1 | 7/2021 | Edwards et al. | |
| 2022/0026139 | A1* | 1/2022 | LaValley | F25D 11/003 |

OTHER PUBLICATIONS

International Search Report and Written Opinion for International Patent Application No. PCT/US2023/079496, mailed Mar. 13, 2024, 12 pages.

* cited by examiner

*Primary Examiner* — Kyle O Logan
(74) *Attorney, Agent, or Firm* — Withrow + Terranova, PLLC

(57) ABSTRACT

Systems and methods for temperature driven dynamic order sequencing in order fulfillment are provided herein. In some embodiments, a method of controlling two or more actively cooled totes includes: determining a first ordering of the two or more actively cooled totes; determining that an alert condition occurred for an alerted tote of the two or more actively cooled totes; and determining a second ordering of the two or more actively cooled totes based on the alert condition where the alerted tote is in a different position in the ordering than in the first ordering. Dynamic tote arrangement can therefore ensure that customer orders are sequences appropriately based on the temperature warnings the totes provide, minimizing spoilage in the tote queue process.

20 Claims, 8 Drawing Sheets

TEMPERATURE-DRIVEN DYNAMIC ORDER SEQUENCING IN ORDER FULFILLMENT

RELATED APPLICATIONS

This application claims the benefit of provisional patent application Ser. No. 63/424,562, filed Nov. 11, 2022, the disclosure of which is hereby incorporated herein by reference in its entirety.

FIELD OF THE DISCLOSURE

The disclosure relates generally to temperature-controlled environments.

BACKGROUND

Cold chain transport for food, drug or any products that need temperature control for delivery currently is done with tri-temperature or refrigerated trucks and vans upfitted with compressor based systems that cool or freeze the entire sectioned area of a truck and must be run constantly to maintain temperature inside the truck weather the truck has one gallon of mike or a pint of ice cream you need to cool or freeze the entire space. Compressor based refer trucks and tri temp trucks or van must be penetrated from the outside to get the cooling platform of a compressor-based system inside the truck or van voiding the warranty of the van or truck. In addition, to run try temperature trucks you must use dividers between the temperature zones to maintain temperature. The separation of space requires you to separate orders that have goods in two or more zones. Compressor based systems pull too much power for the system to be placed in or on a fully electric vehicle without degrading the range of the vehicle significantly. Improved systems and methods for thermal management are needed.

SUMMARY

Systems and methods for temperature driven dynamic order sequencing in order fulfillment are provided herein. In some embodiments, a method of controlling two or more actively cooled totes includes: determining a first ordering of the two or more actively cooled totes; determining that an alert condition occurred for an alerted tote of the two or more actively cooled totes; and determining a second ordering of the two or more actively cooled totes based on the alert condition where the alerted tote is in a different position in the ordering than in the first ordering.

Dynamic tote arrangement can therefore ensure that customer orders are sequences appropriately based on the temperature warnings the totes provide, minimizing spoilage in the tote queue process.

Order fulfillment software creates batches of sequenced orders to be fulfilled based on order and/or product attribute data. These orders are then fulfilled following a predetermined sequence, arriving at a packing station manually or via automation. An enhancement to the order batching and sequencing processes (the reason for this IP disclosure) would allow for the order fulfillment software to dynamically update the batch content and sequence of orders, and associated products within the orders, containing temperature sensitive attributes, based on the temperature communication provided by the actively cooled totes to the order management software to mitigate food safety concerns and potential product spoilage.

This process enhancement has immense value in eCommerce applications where temperature-sensitive product such as, but not limited to, frozen goods, fresh produce or some pharmaceuticals need to remain in temperature-specific custody to guarantee safety, product integrity, and high customer satisfaction.

In some embodiments, APIs include temperature warning data messages to the host software so that customers can determine how they want to manage the exceptions within their software, depending on the hardware portion of solution chosen for their end-customer's application. The functionality of this enhancement works with a variety of manual and automated fulfillment platforms including but not limited to: operators manually fulfilling with handheld technologies, convey and sort applications, and robotic applications.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
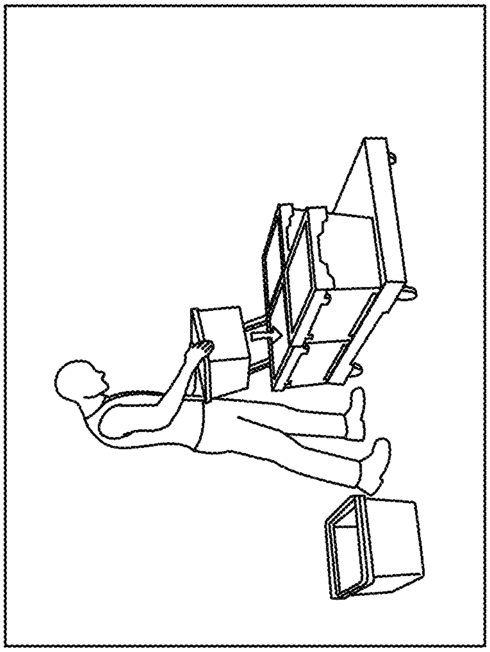
FIGS. 1A-1D illustrate utilization of a portable, self-contained, refrigeration or freezing system, coupled with integrated automated controls and monitoring.
Figure 1B:
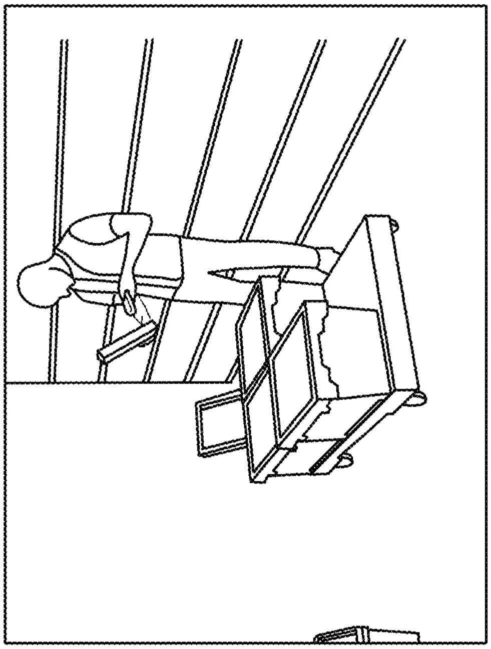
Figure 1C:
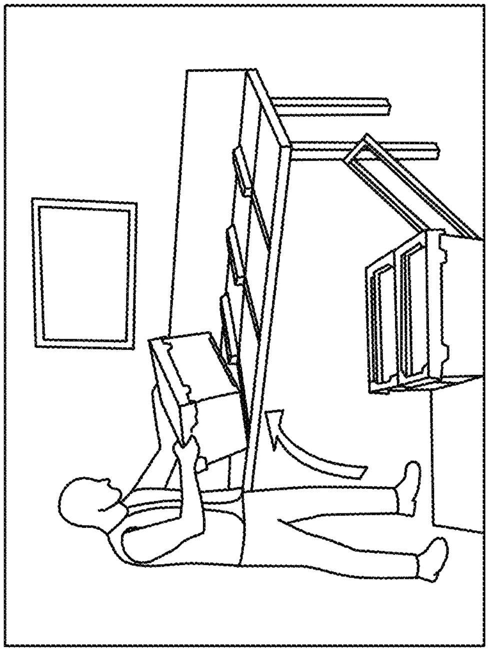
Figure 1D:
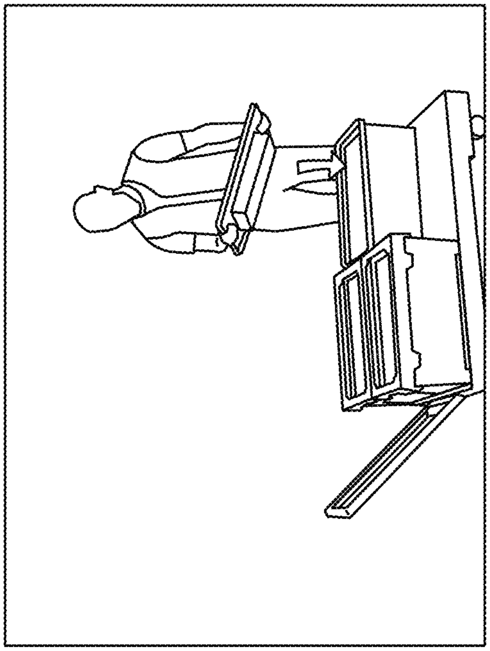

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Cold chain transport for food, drug or any products that need temperature control for delivery currently is done with tri temperature or refer trucks and vans upfitted with compressor based systems that cool or freeze the entire sectioned area of a truck and must be run constantly to maintain temperature inside the truck weather the truck has one gallon of mike or a pint of ice cream you need to cool or freeze the entire space. Compressor based refer trucks and tri temp trucks or van must be penetrated from the outside to get the cooling platform of a compressor-based system inside the truck or van voiding the warranty of the van or truck. In addition, to run try temperature trucks you must use dividers between the temperature zones to maintain temperature. The separation of space requires you to separate orders that have goods in two or more zones. Compressor based systems pull too much power for the system to be placed in or on a fully electric vehicle without degrading the range of the vehicle significantly.

The alternative to compressor-based cooling is to use passive cooling products like gel packs or dry ice to cool products packaged inside of boxes or totes, this is a very costly process in both labor and materials. Both the use of compressor and passive cooling and freezing is very damaging to the environment because of the refrigerant, the materials or the continuous running of the truck and compressor to maintain temperature.

Upfitting the transport vehicle with thermal electric active cooling and freezing totes with on demand cooling and sustainable refrigerants that require no penetration to the van/truck and minimal impact to range on electric vehicles.

The ability to use mobile and transportable containers using thermal electric cooling to be placed in transportation vehicles (e.g., van, box truck, car, train, plane, boat) would include the ability to use the same containers to transport between physical centers like MFC, stores and the mobile vehicle all the way to the house, apartment, or place of business. This would also include all IOT capabilities for command, control, and monitoring of the temperature of each container is transport. In some embodiments, this is used in an EV or combustion engine vehicles and using the power source of the vehicle and or a battery pack that would be recharged by the vehicle to power our totes.

Last mile delivery of food requires temperature-controlled transport of perishable food items using transit vans or similar vehicles. For temperature control, refrigerated or freezer totes can be used which are installed in the van (e.g., a cargo van) or a box truck.

These totes use an active heat pump to pull heat from an enclosed chamber and reject it to the surrounding ambient environment. When this is in an enclosed location such as a delivery van, the hot air can be removed from the van to improve operational performance of the totes.

These totes require power while in transit maintain food safety requirements for perishable consumption. The electrical system needed to reach (and/or maintain) the correct temperature should meet certain expectations for the operation of the totes.

FIGS. 1A-1D illustrate utilization of a portable, self-contained, refrigeration or freezing system, coupled with integrated automated controls and monitoring.

Figure 2:
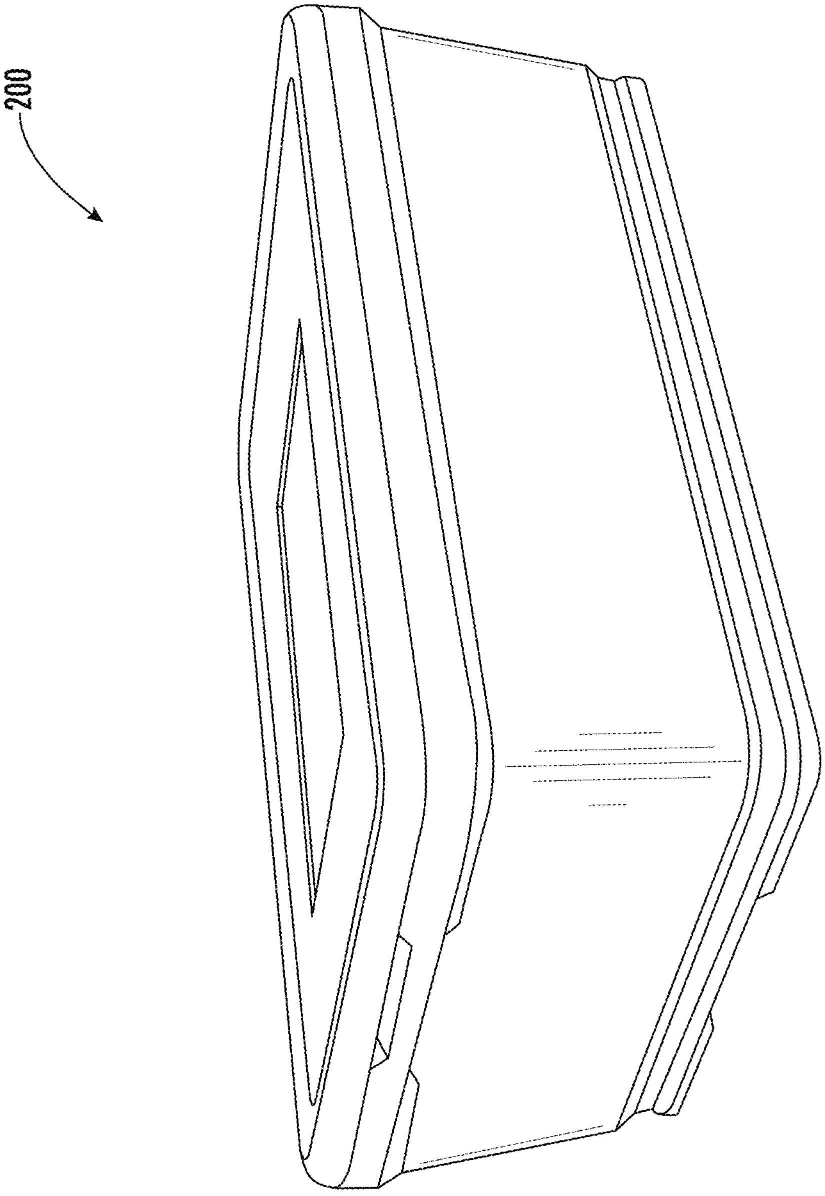
FIG. 2 and FIGS. 3A and 3B illustrate an example embodiment of an active cooler in accordance with embodiments of the present disclosure.
Figure 3A:
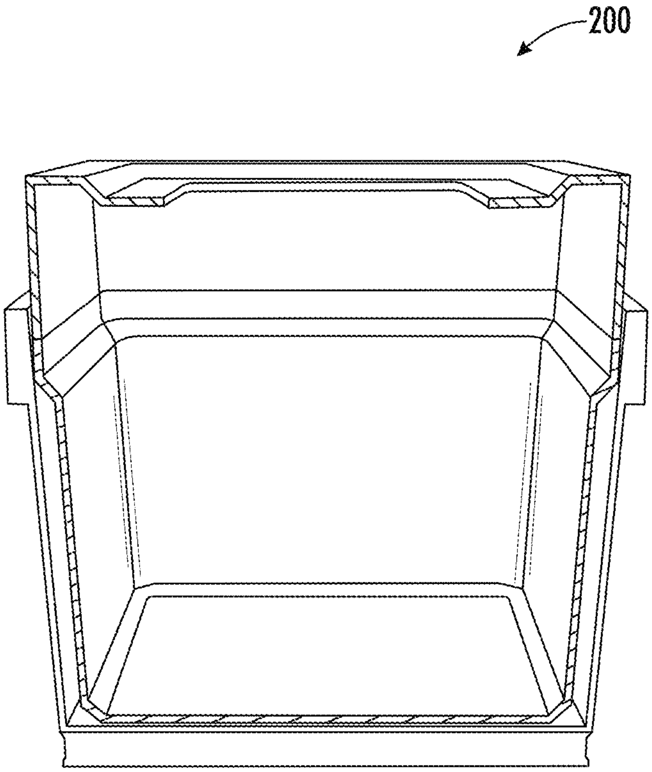
Figure 3B:
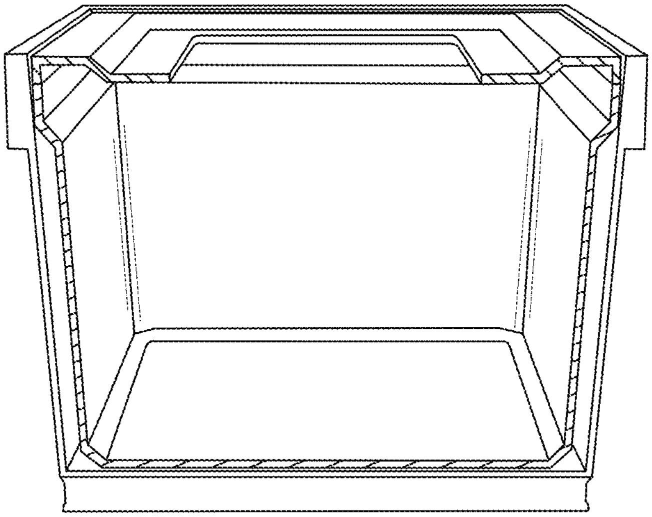

FIG. 2 and FIGS. 3A and 3B illustrate an example embodiment of an active cooler in accordance with embodiments of the present disclosure.

Figure 4:
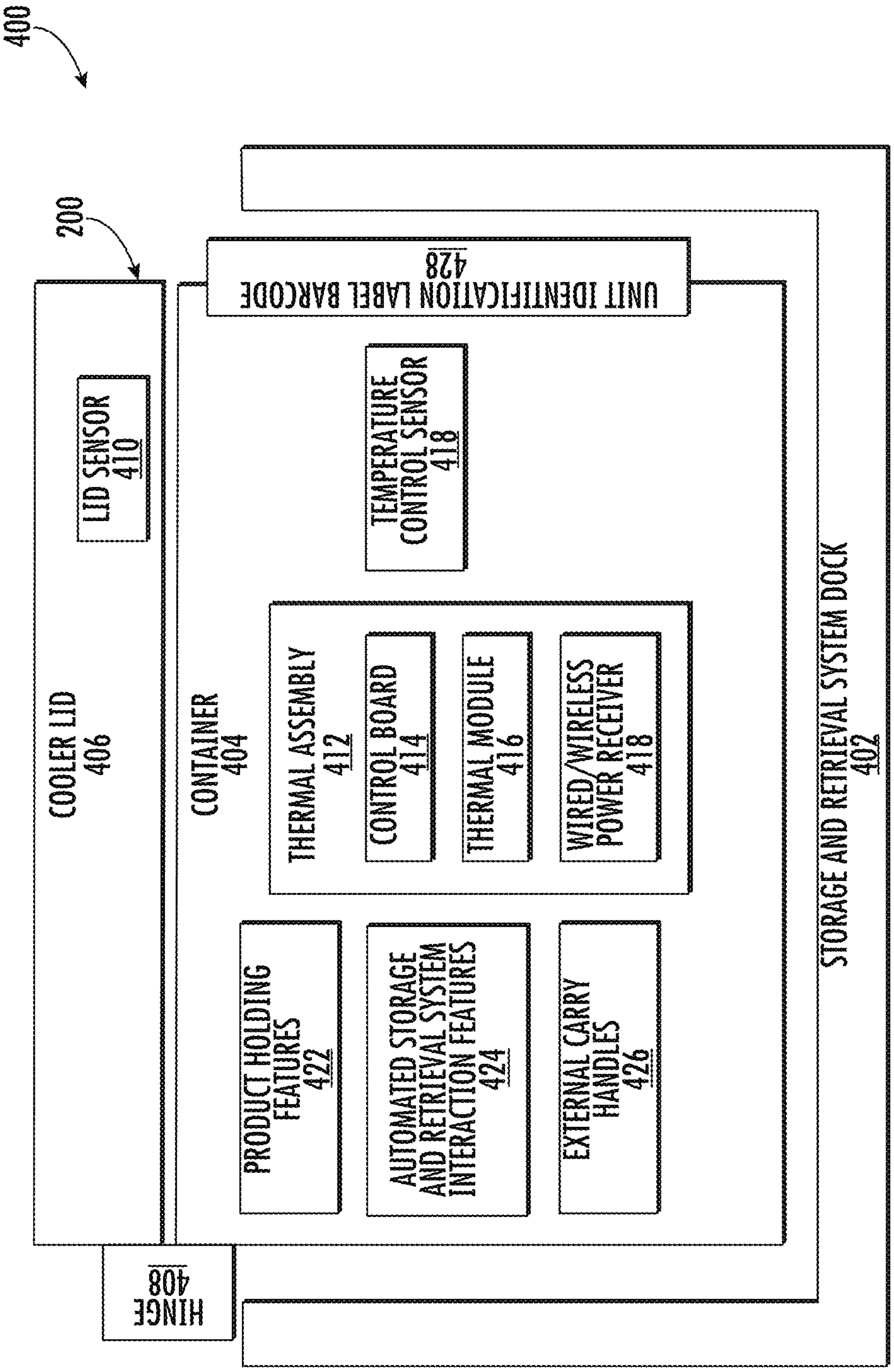
FIG. 4 illustrates a system including an active cooler in accordance with some embodiments of the present disclosure.

FIG. 4 illustrates a system including an active cooler in accordance with some embodiments of the present disclosure.

For more details, the interested reader is directed to U.S. Provisional Patent Application Ser. No. 62/953,771, entitled THERMOELECTRIC REFRIGERATED/FROZEN PRODUCT STORAGE AND TRANSPORTATION COOLER; U.S. patent application Ser. No. 17/135,420, entitled THERMOELECTRIC REFRIGERATED/FROZEN PRODUCT STORAGE AND TRANSPORTATION COOLER, now U.S. Patent Application Publication No. 2021/0199353 A1; and International Patent Application No. PCT/US2020/067172, entitled THERMOELECTRIC REFRIGERATED/FROZEN PRODUCT STORAGE AND TRANSPORTATION COOLER, now International Patent Publication No. WO 2021/134068. These applications are hereby incorporated herein by reference in their entirety.

Figure 5:
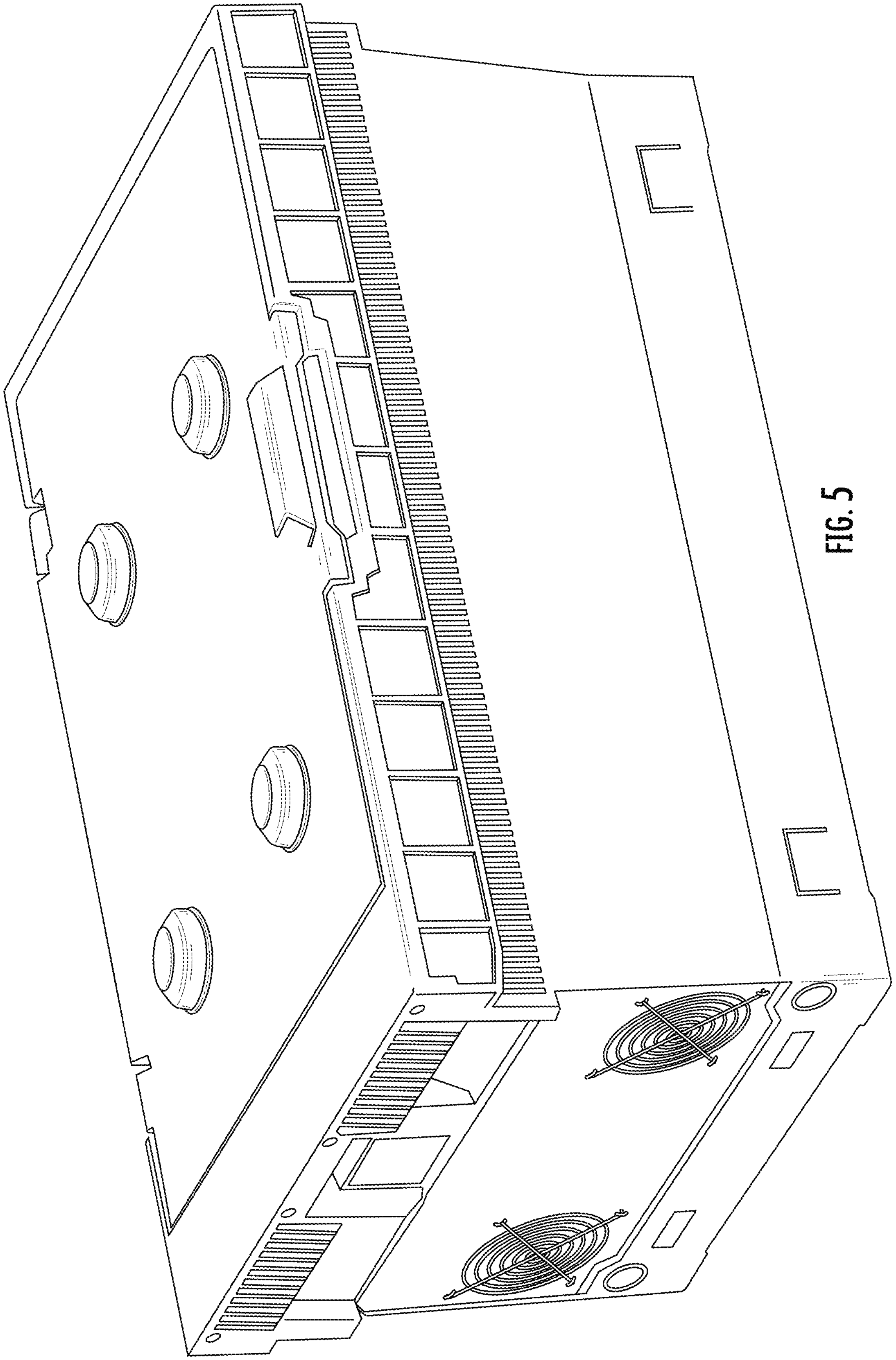
FIG. 5 illustrates an example of a tote as discussed herein.
Figure 6A:
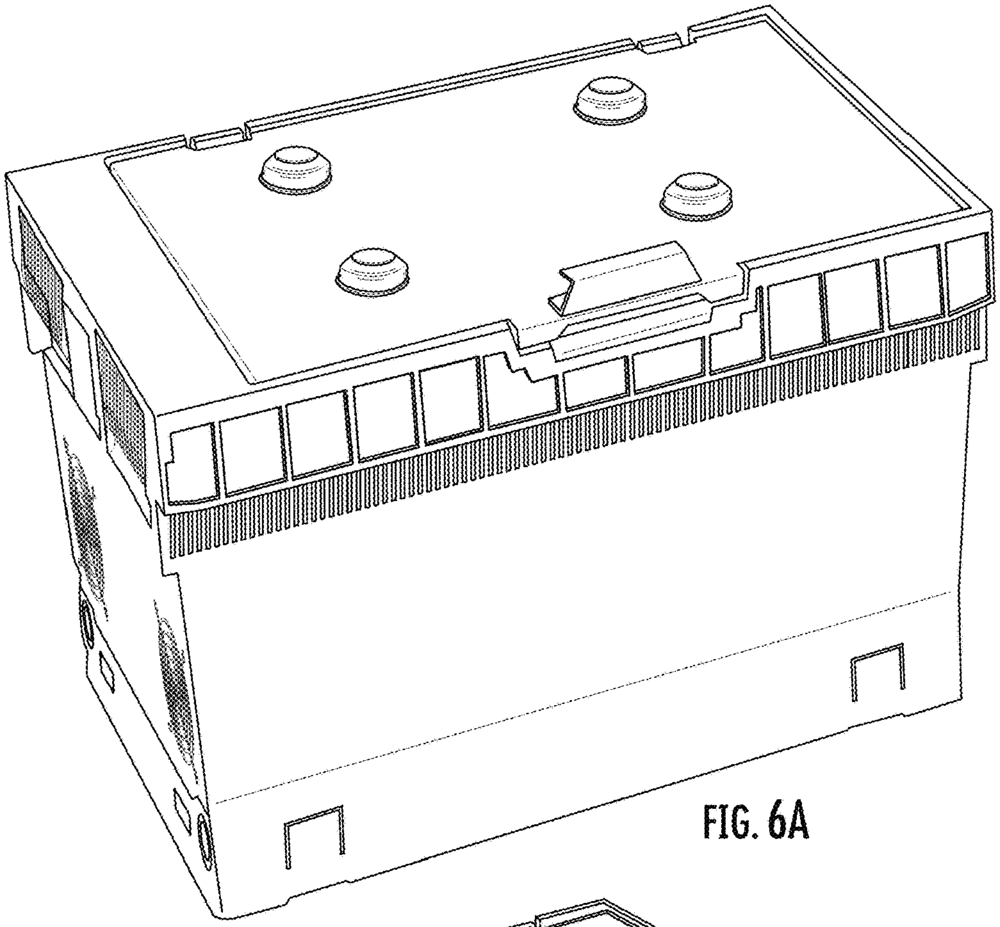
FIGS. 6A and 6B illustrate that different versions of the totes could be used in refrigerator or freezer versions.
Figure 6B:
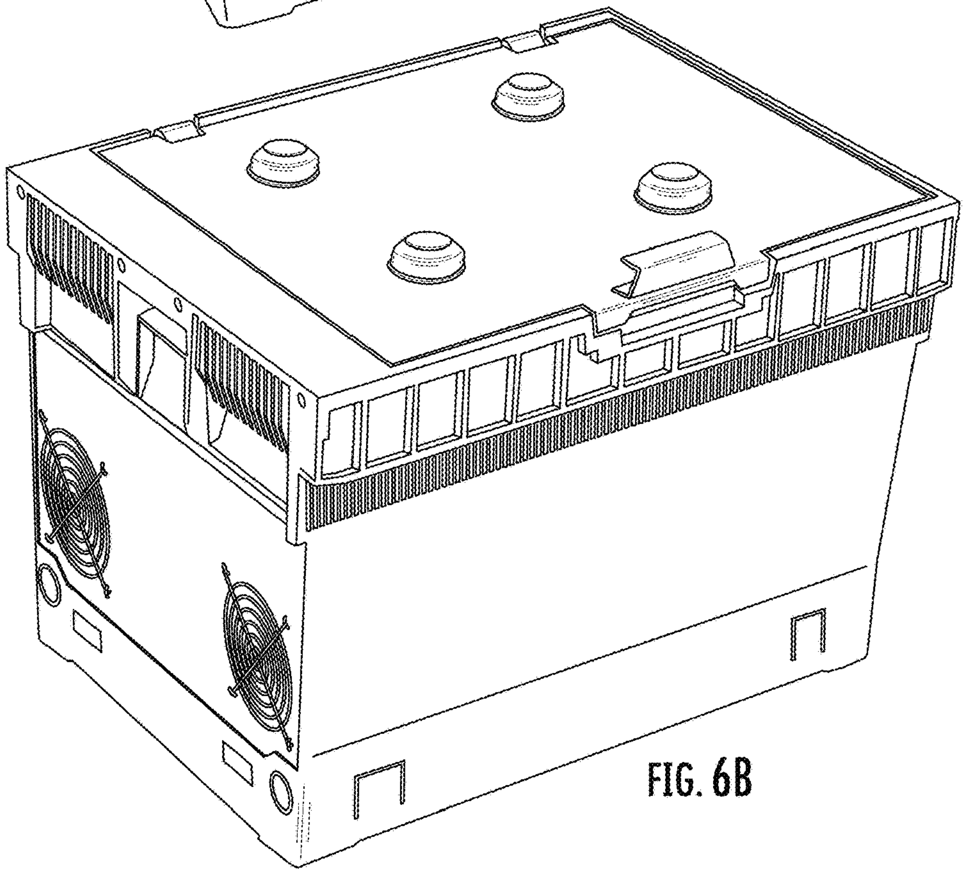
Figure 7:
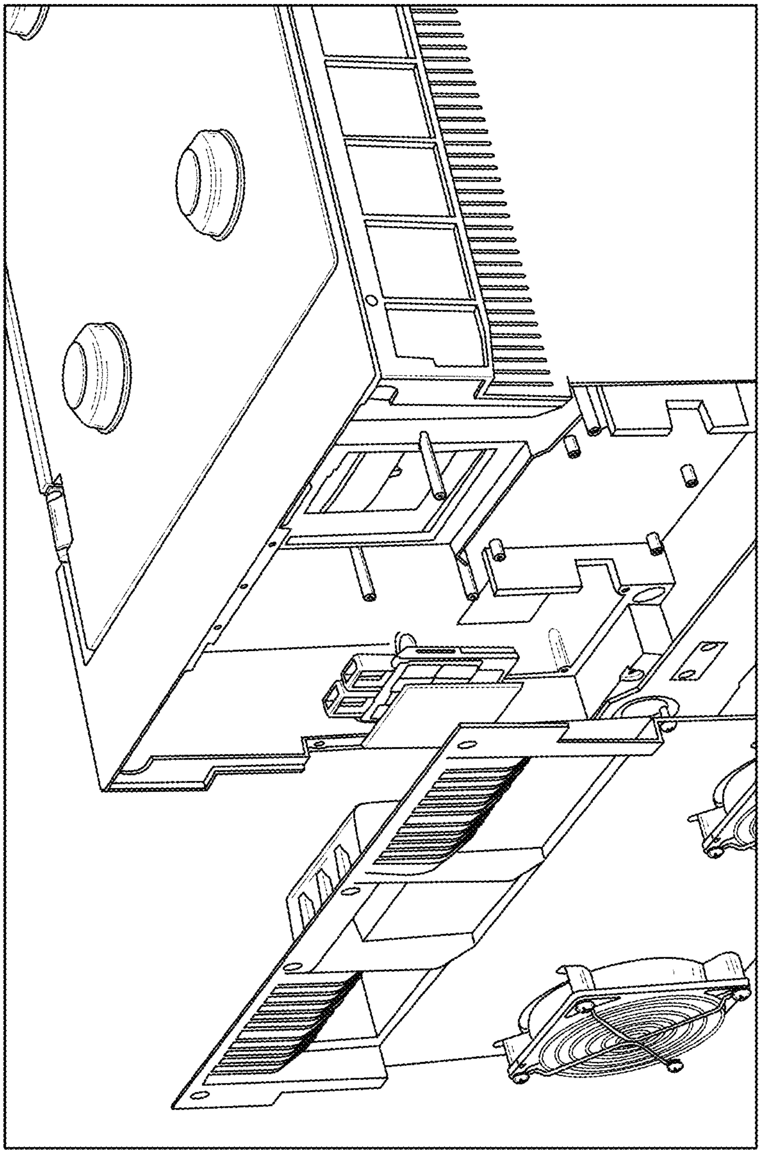
FIG. 7 shows an exploded view of the tote that includes a thermoelectric unit as discussed herein.

FIG. 5 illustrates an example of a tote as discussed herein. FIGS. 6A and 6B illustrate that different versions of the totes could be used in refrigerator or freezer versions. FIG. 7 shows an exploded view of the tote that includes a thermoelectric unit as discussed herein.

While the embodiments described herein use AMR's (Automated guided vehicle) as the hardware means of fulfillment, embodiments can be executed by other hardware solutions.

Figure 8:
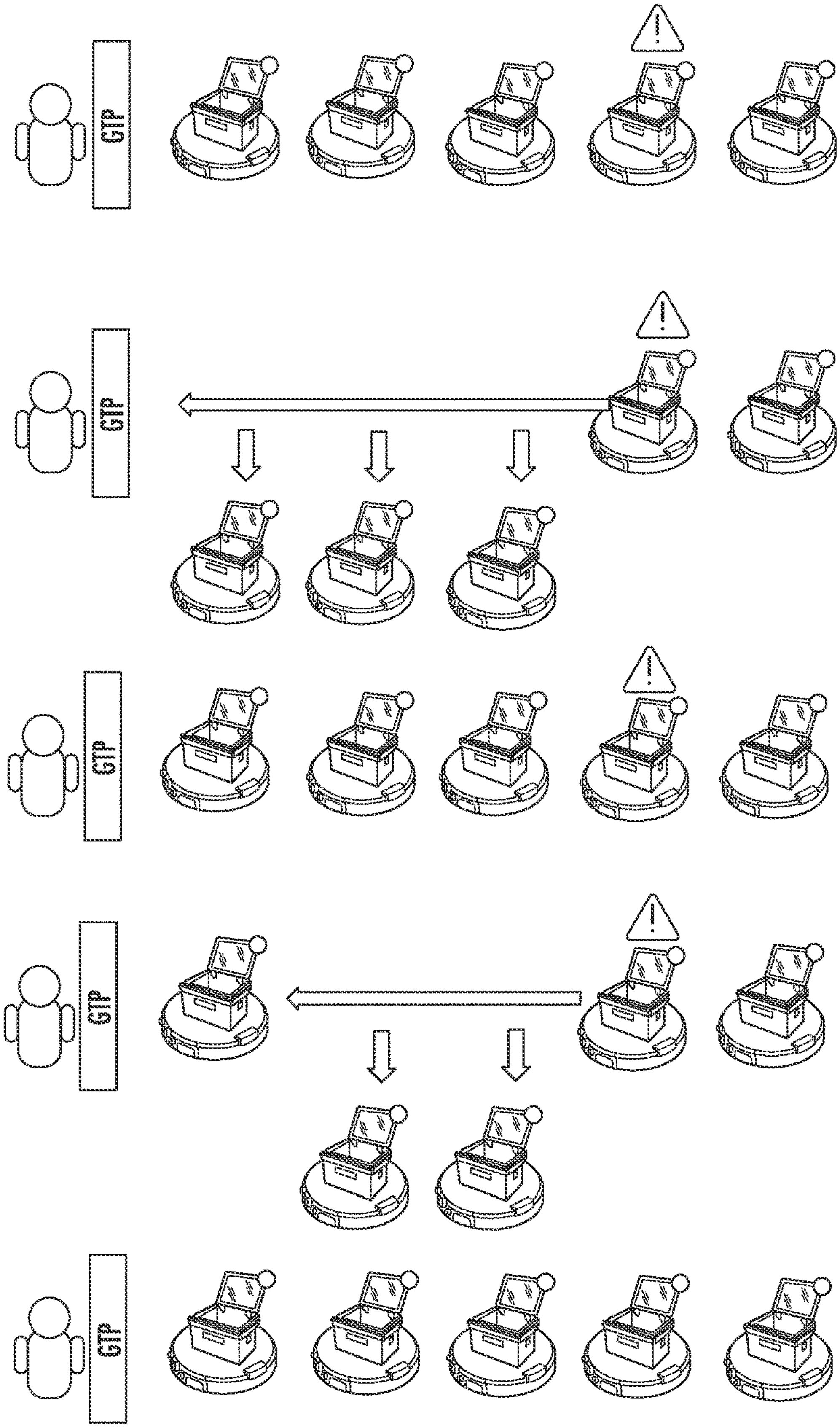
FIG. 8 illustrates an example embodiment in accordance with some embodiments of the present disclosure.

FIG. 8 illustrates an example embodiment in accordance with some embodiments of the present disclosure. With AMR GTP (Goods to Person station (where the order is packed)), totes queue up in front of the operator in a pre-assigned priority order from the WES (Warehouse Execution Software) relative to their order priority. In this scenario, tote D sends a warning to tote IoT that it is getting close to its threshold temperature for product safety or integrity. The tote sends a message to the WES alerting WES that an action needs to be taken.

In this scenario, WES has one of four options:

1: Deprioritize order and send storage tote back to ASRS rack position.

2: Do nothing with the tote in queue and decline the warning.

3: Send the tote to a nearby order buffer charging rack.

4: Dynamically change the order of totes in the GTP queue (and this the order priority in WES) and move the tote (and corresponding order) to the front of the line to be the next order processed (or at least early enough to avoid negative repercussions for the product in the tote).

In some embodiments, the preceding totes would move out of the way, creating a bypass or some other method. The displaced totes would fall back in the prior sequence based on the earlier order priority, but behind the expedited tote D. Shortly thereafter, tote C gives WES the same warning that it needs to be dispositioned based on the above options WES can make.

Totes A and B are displaced, creating a bypass so tote C can move up in priority.

Dynamic tote arrangement can therefore ensure that customer orders are sequences appropriately based on the temperature warnings the totes provide WES, minimizing spoilage in the tote queue process.

Order fulfillment software creates batches of sequenced orders to be fulfilled based on order and/or product attribute data. These orders are then fulfilled following a predetermined sequence, arriving at a packing station manually or via automation. An enhancement to the order batching and sequencing processes would allow for the order fulfillment software to dynamically update the batch content and sequence of orders, and associated products within the orders, containing temperature sensitive attributes, based on the temperature communication provided by the actively cooled totes to the order management software to mitigate food safety concerns and potential product spoilage.

This process enhancement has immense value in eCommerce applications where temperature-sensitive product such as, but not limited to, frozen goods, fresh produce or some pharmaceuticals need to remain in temperature-specific custody to guarantee safety, product integrity, and high customer satisfaction.

In some embodiments, APIs include temperature warning data messages to the host software so that customers can determine how they want to manage the exceptions within their software, depending on the hardware portion of solution chosen for their end-customer's application. The functionality of this enhancement works with a variety of manual and automated fulfillment platforms including but not limited to: operators manually fulfilling with handheld technologies, convey and sort applications, and robotic applications.

Those skilled in the art will recognize improvements and modifications to the preferred embodiments of the present disclosure. All such improvements and modifications are considered within the scope of the concepts disclosed herein and the claims that follow.

What is claimed is:

1. A method of controlling two or more actively cooled totes, the method comprising:

determining, by a computing system, a first ordering of the two or more actively cooled totes within a fulfillment queue;

determining, based on sensor data received from the actively cooled totes including at least one of temperature data or battery data, that an alert condition occurred for an alerted tote of the two or more actively cooled totes;

determining, by the computing system, a second ordering of the two or more actively cooled totes within the fulfillment queue based on the alert condition where the alerted tote is moved to a different relative position with respect to at least one other of the two or more actively cooled totes compared to the first ordering; and causing physical movement or routing of the two or more actively cooled totes in accordance with the second ordering.

2. The method of claim 1 wherein the two or more actively cooled totes are controlled by one or more automated guided vehicles.

3. The method of claim 1 wherein one or both of the first ordering and second ordering are determined by a Warehouse Execution Software executing on one or more processors and configured to control movement of the actively cooled totes.

4. The method of claim 1 wherein determining that the alert condition occurred for the alerted tote comprises receiving a warning from the alerted tote via a wireless communication interface.

5. The method of claim 4 wherein the warning from the alerted tote indicates the alerted tote is getting close to its threshold temperature for product safety or integrity.

6. The method of claim 1 wherein determining the second ordering comprises one or more of:

deprioritizing the alerted tote relative to at least one other tote in the fulfillment queue and/or sending the alerted tote back to a rack position or other charging location;

sending the alerted tote to an order buffer charging rack;

moving the alerted tote to the front of the line to be the next order processed ahead of at least one other tote; and moving the alerted tote at least early enough to avoid negative repercussions for the product in the alerted tote.

7. The method of claim 1 wherein one or more totes preceding the alerted tote are moved out of the way in response to the second ordering to enable advancement of the alerted tote within the fulfillment queue.

8. The method of claim 1 wherein determining that an alert condition occurred for an alerted tote comprises determining that an amount of battery left for the alerted tote is insufficient for the amount of time needed to schedule the alerted tote based on a predicted duration of the fulfillment queue.

9. A system for controlling two or more actively cooled totes, the system comprising processing circuitry configured to:

determine, by the processing circuitry, a first ordering of the two or more actively cooled totes within a fulfillment queue;

determine, based on sensor data received from the actively cooled totes including at least one of temperature data or battery data, that an alert condition occurred for an alerted tote of the two or more actively cooled totes;

determine, by the processing circuitry, a second ordering of the two or more actively cooled totes within the fulfillment queue based on the alert condition where the alerted tote is moved to a different relative position with respect to at least one other of the two or more actively cooled totes compared to the first ordering; and cause physical movement or routing of the two or more actively cooled totes in accordance with the second ordering.

10. The system of claim 9 wherein the two or more actively cooled totes are controlled by one or more automated guided vehicles.

11. The system of claim 9 wherein one or both of the first ordering and second ordering are determined by a Warehouse Execution Software configured to dynamically rearrange the fulfillment queue based on the alert condition.

12. The system of claim 9 wherein determining that the alert condition occurred for the alerted tote comprises being configured to: receive a warning from the alerted tote via a network communication interface.

13. The system of claim 12 wherein the warning from the alerted tote indicates the alerted tote is getting close to its threshold temperature for product safety or integrity.

14. The system of claim 9 wherein determining the second ordering comprises being configured to perform one or more of:

deprioritize the alerted tote relative to at least one other tote in the fulfillment queue and/or sending the alerted tote back to a rack position or other charging location;

send the alerted tote to an order buffer charging rack;

move the alerted tote to the front of the line to be the next order processed ahead of at least one other tote; and move the alerted tote at least early enough to avoid negative repercussions for the product in the alerted tote.

15. The system of claim 9 wherein one or more totes preceding the alerted tote are moved out of the way in response to the second ordering to enable advancement of the alerted tote within the fulfillment queue.

16. The system of claim 9 wherein determining that an alert condition occurred for an alerted tote comprises being configured to: determine that an amount of battery left for the alerted tote is insufficient for the amount of time needed to schedule the alerted tote based on a predicted duration of the fulfillment queue.

17. The method of claim 1, wherein determining that the alert condition occurred comprises:

continuously monitoring, in real time, temperature data of each of the two or more actively cooled totes and automatically identifying the alert condition without human intervention.

18. The method of claim 1, wherein:

determining that the alert condition occurred comprises predicting, based on the sensor data, that the alerted tote will exceed a threshold condition before completion of the fulfillment queue.

19. The method of claim 1, wherein determining the second ordering comprises:

reordering a plurality of the two or more actively cooled totes relative to each other such that at least one tote other than the alerted tote changes position within the fulfillment queue in response to the alert condition.

20. The system of claim 9, wherein the processing circuitry is further configured to:

transmit control commands to one or more material handling systems to physically reposition the actively cooled totes according to the second ordering.

* * * * *